United States Patent
Cox et al.

(10) Patent No.: US 6,418,973 B1
(45) Date of Patent: Jul. 16, 2002

(54) INTEGRALLY WOVEN CERAMIC COMPOSITES

(75) Inventors: Brian N. Cox; David B. Marshall; Janet B. Davis, all of Thousand Oaks; Min Z. Berbon, Simi Valley, all of CA (US)

(73) Assignee: Boeing North American, Inc., Seal Beach, CA (US)

( * ) Notice: Subject to any disclaimer, the term of this patent is extended or adjusted under 35 U.S.C. 154(b) by 0 days.

(21) Appl. No.: 09/219,681

(22) Filed: Dec. 23, 1998

Related U.S. Application Data (63) Continuation-in-part of application No. 08/736,559, filed on Oct. 24, 1996.

(51) Int. Cl.[7] .............................................. D03D 23/00
(52) U.S. Cl. .................................................. 139/383 R
(58) Field of Search ..................................... 139/383 R (56) References Cited

U.S. PATENT DOCUMENTS

| | | |
|---|---|---|
| 3,966,522 A | 6/1976 | Hatch et al. |
| 4,063,684 A | 12/1977 | O'Brien et al. |
| 4,181,450 A | 1/1980 | Rasen et al. |
| 4,233,356 A | 11/1980 | Jacobs |
| 5,080,142 A | 1/1992 | Calamito et al. |
| 5,350,545 A | 9/1994 | Streckert et al. |
| 5,451,448 A | 9/1995 | Sawko et al. |
| 5,582,784 A | 12/1996 | Daws |
| 5,657,795 A | 8/1997 | Sawko et al. |
| 5,840,221 A | 11/1998 | Lau et al. |

FOREIGN PATENT DOCUMENTS

EP           1 013 412 A1     6/2000

OTHER PUBLICATIONS

Preform Fiber Architecture for Ceramic–Matrix Composites, Frank K. Ko, Fibrous Materials Research Lab. & Dept. of Materials Engineering, Drexel Univ., Philadelphia, PA, in American Ceramic Soc. Bull. 2/89.

Primary Examiner—John J. Calvert
Assistant Examiner—Robert H. Muromoto, Jr.
(74) Attorney, Agent, or Firm—Stout, Uxa, Buyan & Mullins, LLP; Donald E. Stout (57) ABSTRACT

A woven preform for a ceramic composite has a plurality of layers and structural members. The plurality of layer are of woven yarns of fibrous material. The structural members extend between the layers. The layers and members define interlayer spaces. One or more of the layers may have a plurality of openings extending therethrough. Low density ceramic insulation made be deposited in the interlayer spaces via a slurry that enters the preform, or the preform after it has been made a part of a composite, through the openings. The carrier of the slurry exits the preform, leaving the randomly packed fibers in the interlayer spaces. The structural members may be walls that, along with the layers, define channels. The channels may be used to direct fluid through so as the composite functions as an insulator. The channels may be directed in the warp direction for achieving increased benefits.

42 Claims, 6 Drawing Sheets

INTEGRALLY WOVEN CERAMIC COMPOSITES

This application is a continuation-in-part of application Ser. No. 08/736,559 filed Oct. 24, 1996 and entitled Integrally Woven Ceramic Composites, the contents of which are expressly incorporated herein by reference.

BACKGROUND OF THE INVENTION

1. Field of the Invention

The present invention relates to ceramic composites and, in particular, to integrally woven ceramic composite structures used in insulation.

2. Description of the Related Art

In certain high temperature operating environments, such as exterior surfaces of space reentry vehicles and combustion chambers and nozzles in jet engines, rocket engines, and power generators, for example, thermal barriers are necessary to protect supporting structures and equipment. A combustion chamber liner, for example, must be mounted on a strong surrounding structure, typically metal, which must be kept relatively cool and protected from heat, both radiant and conductive. Ceramic materials have utility as thermal barriers because of their high temperature stability. Moreover, since thermal barrier components typically comprise large panels or shell structures that are difficult to fabricate from monolithic ceramics, fiber reinforced ceramic composites are preferred.

In extremely high heat flux environments, such as in rocket engines, the thermal barrier material must also be actively cooled by some mechanism, such as an internally circulating fluid, because the operating temperatures exceed the capabilities of the exposed ceramic materials. All non-ablative rocket nozzles are currently designed in this manner, using high conductivity metals with internal channels for flow of coolant (usually high pressure fuel). The high conductivity is needed to maintain the temperature of the hot surface below the melting point of the metal. If ceramic composites could be used instead of than metals for such structures, large improvements in engine performance would result from: (I) reduced weight; and (ii) reduced heat flux absorbed at the hot surface because of the higher temperature capability of the ceramic. However conventional ceramic composite fabrication methods cannot produce structures capable of satisfying the combined requirements of high pressure containment and high heat flux management.

State-of-the-art ceramic composites are built up to the required thickness using stacked layers of fiber fabrics that are subsequently infiltrated with a ceramic matrix. Unfortunately, such layered composites are not suited to the formation of the structures needed for actively cooled panels because of their susceptibility to delamination of the layers, leading to catastrophic failure.

A preferred approach for forming such panels would be to begin with an integrally woven 3-dimensional fiber preform of the desired shape, with reinforcing fibers in walls and face sheets surrounding internal cavities aligned everywhere predominantly parallel to the stresses expected in use, and to infiltrate the preform with the desired ceramic matrix. Several methods are known for forming integrally woven structures consisting of face sheets connected by walls aligned along the weft direction during weaving. These walls form internal channels which could be used for coolant flow. However, such weft channel structures have several shortcomings for actively cooled structures: (1) the packing density of fiber yarns aligned around the circumference of weft channels (as needed for pressure containment) is inherently limited by the weaving process, so that thicker walls are required to achieve pressure containment, which defeats satisfaction of the heat flux requirements for high performance rocket nozzle and other applications; (2) low packing densities of fibers around channels makes it difficult to achieve hermetic containment of pressurized cooling fluids; (3) the channel lengths in weft channel structures cannot exceed the width of the loom, imposing severe restrictions to structural designs and increasing the difficulty of the weaving process; and (4) weft channel structures are not easily modified to incorporate connecting structures such as manifolds as part of the woven structure at the ends of the channels or elsewhere.

In some systems, passive thermal insulation systems as opposed to active for reentry vehicles is used. One such system includes space vehicle tiles. The passive thermal insulation systems typically comprise very low density ceramic materials bonded to the metal skin of the vehicle. Because of their low density, such materials are very fragile and susceptible to damage from contact with other objects. It would be desirable to provide such low density materials with an outer protective coating of dense tough ceramic composite material that is not susceptible to debonding, or to sandwich it between front and back faces of tough ceramic composite.

State-of-the-art passive thermal protection panels are built up to the required thickness by bonding a low density core of thermally insulating ceramic or other material to a protective skin or thin relatively dense composite sheet consisting of a fibers infiltrated with a ceramic matrix. Unfortunately, such sandwich structures are not durable as thermal barrier panels because of their susceptibility to delamination of the protective skin, leading to catastrophic failure.

A preferred approach for forming such panels would be to begin with an integrally woven 3-dimensional fiber preform of the desired shape, consisting of face sheets connected by walls or struts, the woven reinforcing fibers in the face sheets and walls or struts being infiltrated with a ceramic matrix, and the spaces between the face sheets and walls or struts being infiltrated with a low density insulation material. Several methods are known for forming integrally woven structures consisting of face sheets connected by walls aligned along the weft direction during weaving. These walls form internal channels which could be used for insertion of passive insulation. However, existing channel structures have the severe shortcoming that access to the space between the front and back skins of the structure for inserting passive insulation materials is limited to the ends of the channels—this is not suitable for the processing methods needed for certain preferred insulation materials.

SUMMARY OF THE INVENTION

The present invention comprises an integrally woven 3-dimensional ceramic composite structure with internal channels aligned in the warp weaving direction. The composite includes a multilayer fabric woven from yarns of fibers such as carbon, silicon carbide, silicon nitride, aluminum oxide, mullite, glass, yttrium aluminum garnet (YAG), polyethylene, and other fibrous materials. At least upper and lower layers (or skins) of the composite comprise woven warp and weft yarns. The layers may form planes or curved surfaces or tubular structures that can be woven tightly for internal fluid pressure containment. The layers are joined or connected by integrally woven warp and weft yarns forming walls or rows of connecting columns so as to form interior channels in conjunction with the skins.

Weaving processes and designs are chosen in such a way that much higher packing densities of fibers are achieved around the perimeter of each channel to improve the ability of the channels to contain pressure without undue increase in the thickness of either the skins or the walls or columns that form the channel structure.

The woven yarns of the composite material are infiltrated or impregnated with a curing agent that may be in the form of fibers, particulates, powders, vapors, or liquids. The curing agent comprises a material, such as a curable polymer in uncured form or a ceramic precursor, for example, that can be cured by exposure to heat or light (such as infrared or ultraviolet radiation), for example, to form a rigid matrix for the infiltrated fiber yarns. A polymer agent optionally may include ceramic particles so that treatment at higher temperatures will sinter the ceramic particles into a ceramic matrix around the woven yarns and eliminate the polymer or convert it into a ceramic. Ceramic matrix material can also be added after either curing or initial heat treatment by chemical vapor infiltration (CVI) or infiltration of a liquid precursor followed by heat treatment. The resulting structure typically includes two or more layers (skins) connected by walls or struts, in which each of the skins and the walls or struts comprise ceramic reinforcing fibers in a ceramic matrix. The cavities of the open lattice structure can be used for circulation of active cooling fluids (liquids or gases), for example.

A principal object of the invention is a structural ceramic composite that includes utility as a high temperature thermal barrier material. A feature of the invention is a multilayer integrally woven ceramic composite structure with internal channels aligned in the warp weaving direction that can include cooling fluids and can be effectively bonded to a supporting structure. An advantage of the invention is a high packing density of reinforcing fibers aligned in the circumferential direction around the channels to allow containment of high pressure fluid and operation in high heat flux environment. Another advantage is that high packing densities of reinforcing fibers reduce gaps and promote hermetic containment of pressurized cooling fluids. Another advantage of the invention is that there is no limit to the length of channels that can be woven conveniently. Another advantage is that highly curved connecting parts or manifolds can be incorporated in the weave at the ends of the channels or elsewhere.

The above list of advantages may be achieved using either active or passive ceramic composite insulation, or a combination of both. Active ceramic composite insulation includes systems in that a fluid is directed through channels in the insulation. Passive ceramic composite insulation includes systems in that channels in the insulation are filled with randomly packed low density ceramic fibers.

In an aspect of the invention, a woven preform for a ceramic composite comprises a plurality of layers and structural members. The plurality of layers are of woven yarns of fibrous material. The structural members extend between the layers. The layers and the structural members define interlayer spaces. In a further aspect of the invention, a plurality of openings extend through at least one of the layers.

In a further aspect of the invention, low density ceramic insulation is disposed in the interlayer spaces. In a still further aspect of the invention, the low density ceramic insulation comprises fibers having a length shorter than an average width of the openings.

In an aspect of the invention, the plurality of layers of woven yarns comprise an upper layer, a lower layer, and one or more central layers disposed between the upper and lower layers. In an aspect of the invention, at least a portion of the plurality of openings extend through the upper layer. In a further aspect of the invention, at least a portion of the plurality of openings extend through at least one of the central layers.

In an aspect of the invention, the low density ceramic insulation is disposed in the interlayer spaces, the insulation comprising of fibers having a length shorter than an average width of the openings. In a further aspect of the invention, the opening average width is approximately 2 mm or greater. In an aspect of the invention, the low density ceramic insulation comprises $Al_2O_3$ fibers or $SiO_2$ fibers that are randomly distributed in a three dimensional arrangement.

In an aspect of the invention, the interlayer spaces are channels. In a further aspect of the invention, wherein the channels extend in a warp direction. In an aspect of the invention, the low density ceramic insulation is disposed in the channels.

In an aspect of the invention, a ceramic composite comprises the woven preform and a matrix.

In an additional aspect, a woven preform for a ceramic composite comprises at least two layers and walls. The two layers are of woven yarns of fibrous material are of woven yarns of fibrous material. The walls extend between the layers. Further, the layers and the walls define channels that extend in a warp direction. In a further aspect of the invention, low density ceramic insulation is disposed in the channels and a plurality of openings extending through one of the layers.

In an additional aspect of the invention, a process for fabricating ceramic composite insulation comprising the steps of providing a woven perform and infiltrating the woven preform. The woven preform comprises a plurality of layers of woven yarns of fibrous material and structural members extending between the layers. The layers and the structural members define interlayer spaces. A plurality of openings extend through at least one the layers. The woven preform is infiltrated with a slurry of a carrier and low density ceramic insulation through the plurality of openings and into the interlayer spaces. At least a portion of the low density ceramic insulation is retained in the interlayer spaces. In an aspect of the invention, a ceramic composite insulation made by the above mentioned process. In a further aspect of the invention, the low density ceramic insulation comprises fibers having a length shorter than an average width of the openings. In a still further aspect of the invention, a ceramic composite that has the short fibers is made according to the above mention process.

In an additional aspect of the invention, a process of insulating a structure comprising the step of joining a ceramic composite to the structure, wherein the ceramic composite comprises a woven preform comprising a plurality of layers of woven yarns of fibrous material and structural members extending between the layers. The layers and the structural members define interlayer spaces. A plurality of openings extend through at least one of the layers. In a further aspect of the invention, fluid is directed through adjacent interlayer spaces. The plurality of layers comprises an upper layer, a lower layer, and at least one central layer disposed between the upper and lower layers. The adjacent interlayer spaces are disposed on opposing sides of a central layer with at least one of the openings extending between the adjacent interlayer spaces, such that the fluid flows between the adjacent channels.

Other aspects, objects, and benefits of the claimed invention are described herein.

DETAILED DESCRIPTION OF THE PREFERRED EMBODIMENTS

Figure 1:
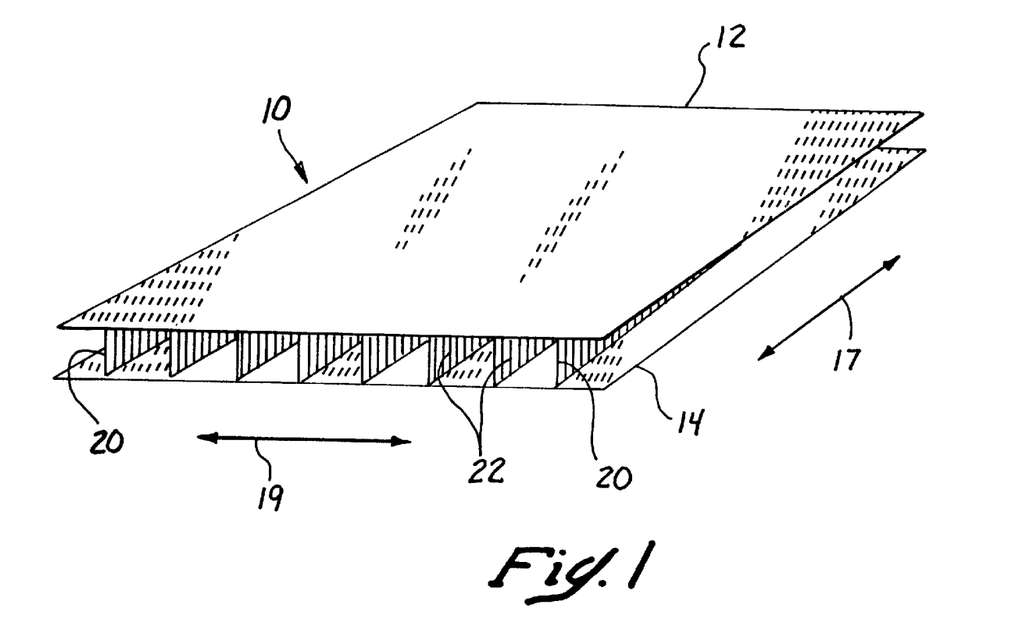
FIG. 1 shows a schematic cross section of a woven preform of the present invention illustrating an upper layer, a lower layer, and integrally woven walls connecting the layers to form channels in warp weaving direction.

Referring now to FIG. 1, woven preform 10 is part of an embodiment of the present invention that comprises a multilayer, integrally woven, ceramic composite structure. The preform 10 comprises layers 12 and 14 of fabric woven from yarns comprising fibers of materials such as silicon carbide, silicon nitride, aluminum oxide, mullite, carbon, glass, yttrium aluminum garnet (YAG), polyethylene, and other fibrous materials. The woven yarns are infiltrated or impregnated with a curing agent, such as a curable polymer or a ceramic precursor, for example, that can be cured to form a rigid composite structure (not shown).

Figure 2:
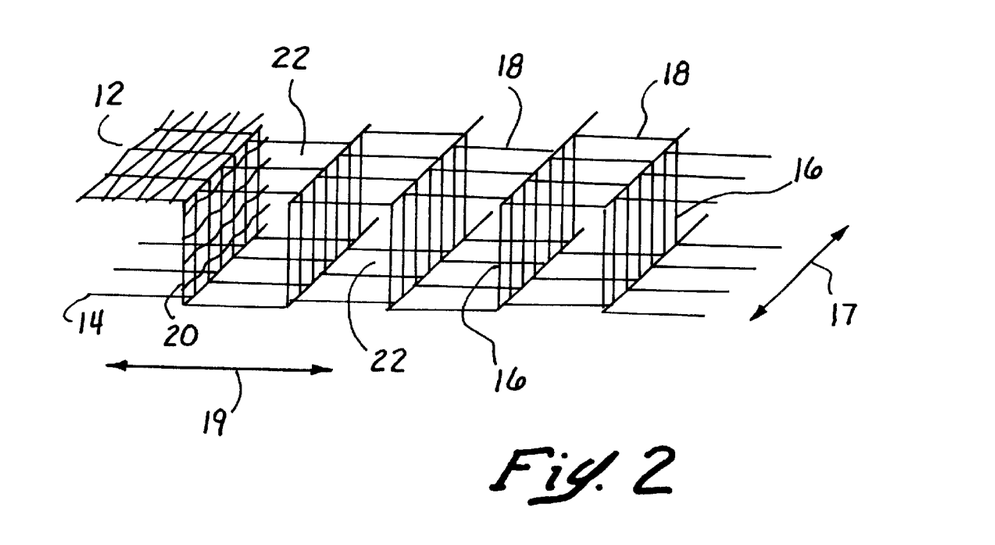
FIG. 2 is a schematic cross sections showing greater detail of arrangements of fiber yarns in the woven material illustrated in FIG. 1, in which walls and skins are formed predominantly of weft fiber yarns and high packing densities of circumferential fibers are achieved around channels.
Figure 3:
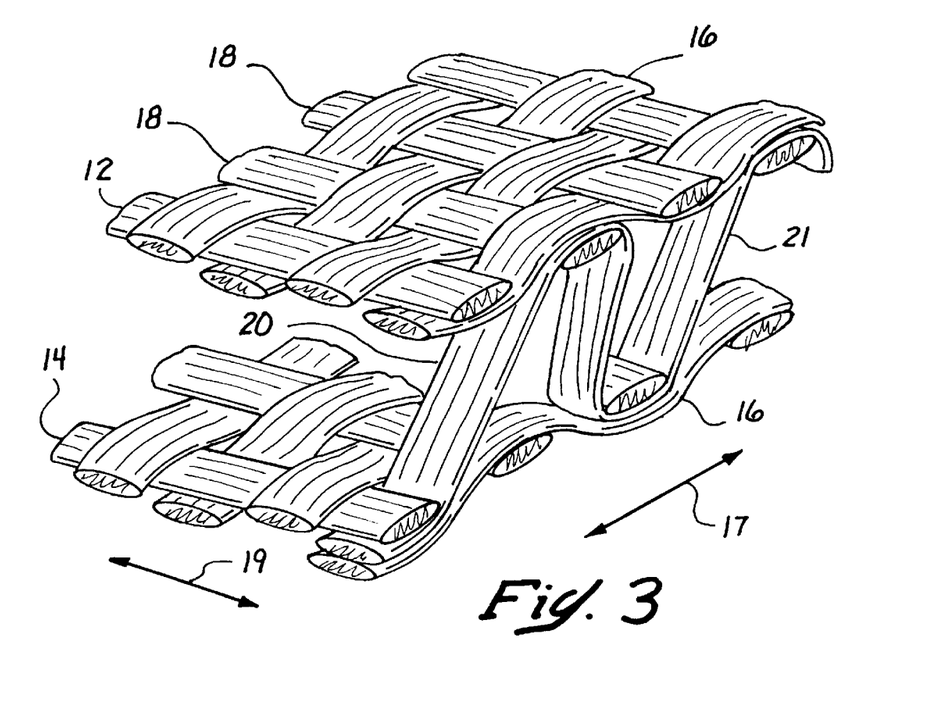
FIG. 3 is a schematic cross section showing greater detail of an arrangement of fiber yarns in the woven material illustrated in FIG. 1, in which walls are formed of warp fiber yarns and gaps in the skins are avoided by arranging wall and skin yarns in the same vertical plane.

FIG. 1 illustrates schematic cross sections of portions of a woven preform of the present invention, with FIGS. 2 and 3 showing enlarged sections of the woven preform 10 of FIG. 1. The woven preform 10 has top and bottom "skins" (not shown) including an upper layer 12 and a lower layer 14. Layers 12 and 14 comprise woven fabrics formed of warp 16 and weft 18 yarns that run in warp direction 17 and weft direction 19, respectively. Woven layers 12 and 14 are joined or connected by walls 20, consisting of integrally woven warp and/or weft yarns that result in the three-dimensional woven preform 10 having channels 22.

The structure and geometry of wall or column forming yarns may comprise various forms in embodiments of the invention, such as supporting struts or woven walls between layers 12 and 14, that provide desired mechanical and thermal characteristics for the final composite structure.

Figure 4:
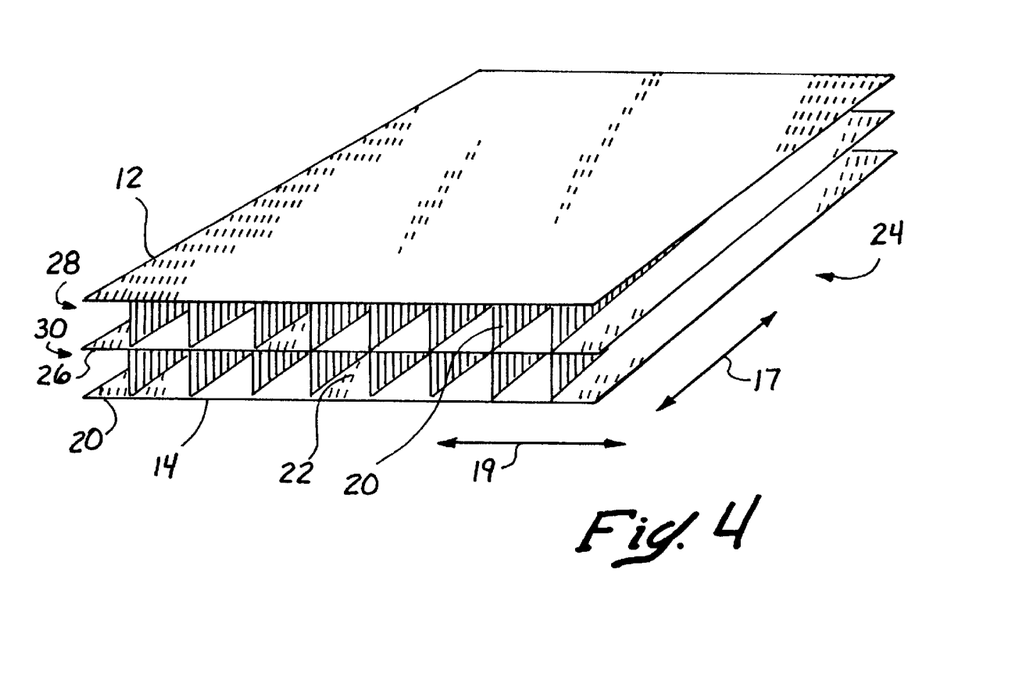
FIG. 4 is a schematic showing the incorporation of a third, central layer connected to both upper and lower skins by integrally woven walls or columns.

Referring now to FIG. 4, a woven preform 24 has a central layer 26 of woven fabric. The central layer 26 may separate the preform 24 into two independent sets 28 and 30 of channels 22. Embodiments of the invention include structures that may be modified in various ways by utilizing the separate interlayer channels 22. For example, the channels 22 in set 28 between the upper layer 12 and the central layer 26 may be filled with a low density ceramic insulation material for additional heat insulation. As a further example, the channels 22 of the set 30 between the central layer 26 and the lower layer 14 may be used for circulation of a cooling liquid or gas. Other embodiments of the invention may have a plurality of central layers 26.

The components of the woven preform 10, comprising the layers 12, 14, 26 and the walls 20, may be infiltrated or impregnated with a curing agent that may be in the form of fibers, particulates, powders, vapors, or liquids. The curing agent may comprise a material, such as a curable polymer in uncured form or a ceramic precursor, for example, that can be cured to form a rigid structure. Curing can be accomplished by exposure to heat or radiation, for example, to form a rigid matrix (not shown) reinforced by the embedded fibers of the warp and weft yarns 16 and 18. A polymer agent may include optional ceramic particles so that treatment at higher temperatures sinters the ceramic particles into a ceramic matrix around the woven yarns 16 and 18, thus eliminating the polymer agent or converting it into a ceramic material. Ceramic matrix material can also be added after either initial heat treatment or curing. Such ceramic material can be introduced by chemical vapor infiltration (CVI), or infiltration of a liquid precursor, followed by heat treatment, for example.

The two layer woven preform 10 shown in FIG. 1 or the multilayer woven preform shown in FIG. 4 forms an excellent thermal barrier for very high temperatures at the exposed upper layer 12 with cool temperatures at the protected lower layer 14 that can be joined or connected to a supporting structure, such as the exterior of a space vehicle (not shown).

In other embodiments, continuous tubes (not shown) can be inserted in the cavities of the open lattice weave, either during or after weaving, for containing a circulating cooling fluid.

Integrally woven composite structures of the present invention have advantages in the field of light-weight, high-stiffness, structural or thermal barrier components, particularly for use in high temperature and high thermal gradient environments. Additional advantages include:

(a) elimination of delamination as a potential failure mode because the skins and connecting struts contain integrally woven reinforcing fibers;

(b) efficient specific flexural stiffness provided by the open lattice structure;

(c) use of skins much thinner than would be required with conventional ceramic materials or composites because of the high flexural rigidity of the integral structure;

(d) high heat transfer with an actively cooled structure;

(e) ease of forming the matrix within the thin skins by liquid or vapor infiltration;

(f) accommodation of thermal strains by the flexibility of the thin through-thickness integral struts; and (g) ease of attaching the relatively cool back skin to a supporting structure.

In addition to thermal barrier applications, integrally woven ceramic composites may be utilized as structural components, such as conformal pressure vessels, for example.

EXAMPLE 1

Active

From analysis of the thermal and mechanical loads on typical rocket engine nozzles, we calculate that a ceramic composite nozzle (not shown) would require a skin of thickness less than about 1 mm between the hot gas and the coolant, channels 22 of about 5 mm diameter for the flow of coolant, and a high volume fraction of the walls and skin consisting of fibers following load-bearing paths circumferentially around the channels. Larger skin thicknesses would lead to outer surface temperatures beyond the capability of the ceramic, while larger channel dimensions or small fiber volume fractions would lead to pressure-induced stresses in the skin exceeding the strength of the ceramic composite.

An embodiment of the invention comprises a specific class of weave structures that satisfies the above requirements consist of channels 22 in the warp weaving direction 17. A feature of the warp channel structure (not shown) is that it possible to align a large volume fraction of fibers in the load bearing circumferential direction. The warp channel structure comprises has a larger volume fraction than is possible than with weft channel structures known in the prior art.

Figure 5:
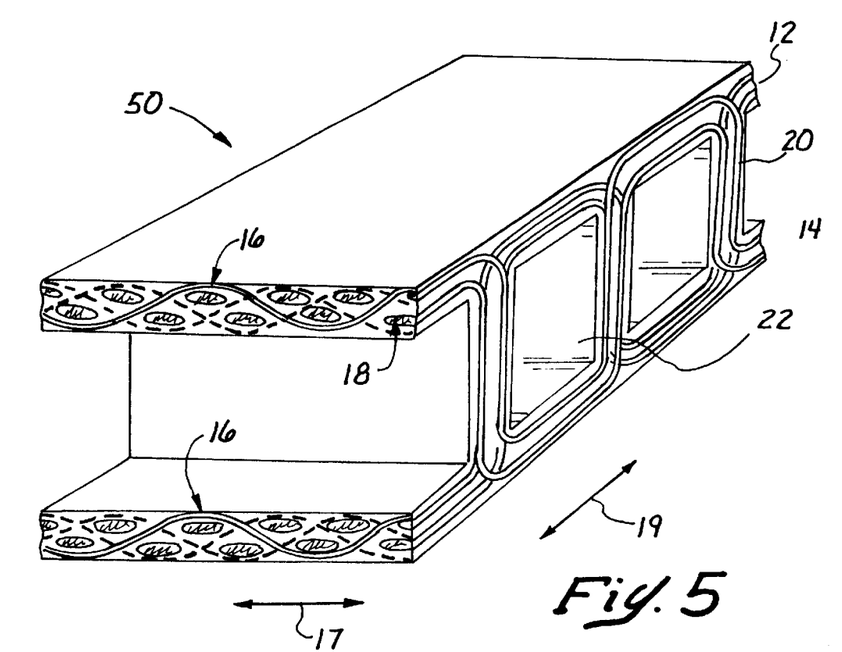
FIG. 5 shows a woven preform with walls of significant height according to an embodiment of the invention.
Figure 6:
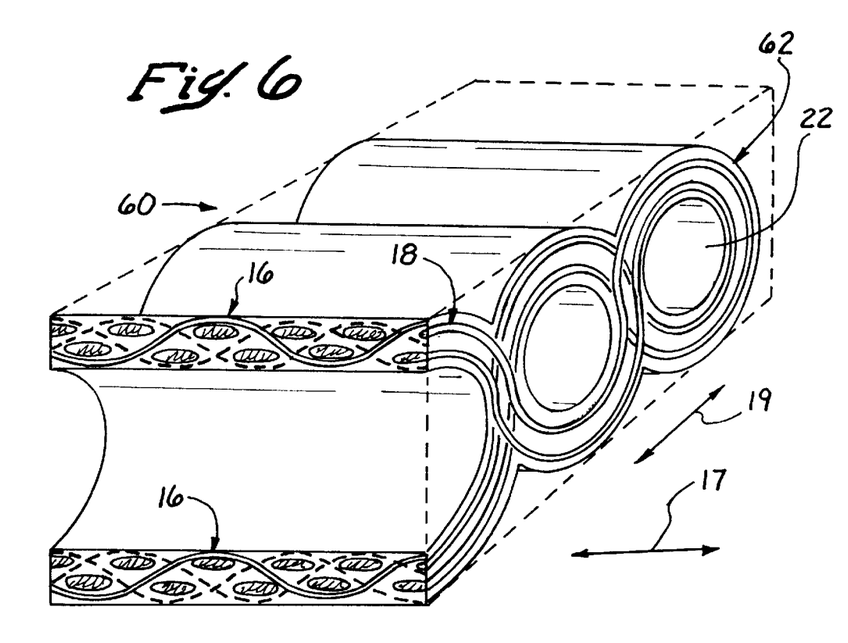
FIG. 6 shows a woven preform with walls of effectively zero height according to an embodiment of the invention.

So-called "warp channel weaves" are formed by passing weft yarns 16 in the circumferential direction around the channels in the patterns shown in FIGS. 5 and 6. Each weft yarn 16 follows a path that alternates between the top and bottom skins or layers of adjacent channels, with the paths of alternate sets of weft yarns 16 being out of phase. High packing densities of the circumferential weft yarns 16 may be achieved by beating up the weft yarns and because the weft yarns in each skin can be woven in multiple layers on top of each other.

Note that for clarity in showing the arrangement of load bearing weft yarns 16, the warp yarns 18 on the section normal to the channels are not shown in FIG. 2 however the warp yarns are shown in FIG. 2 on a section of the top skin 12 and on a wall 20 of the channel on the left.

The warp channel woven structures, preform 10 and 24 for example, differ fundamentally in possible packing densities from woven structures with channels in the weft direction, which are known in the weaving literature. In the prior art weft channel structures, the circumferential yarns are the warp weaving yarns. The packing density of warp weaving yarns is limited by the necessary separation of the warp yarns by the heddles and comb, and by the need for adjacent warp weaving yarns to pass beside each other when they are raised and lowered to form a shed during the weaving process. Since adjacent yarns pass through opposite skins of each channel, the maximum density of circumferential warp yarns in each skin of a weft channel is limited to one yarn for each distance of two yarn diameters along the axis of the channel. In contrast, the warp channel structures do not suffer from this limitation. For example, in the case where each skin of the structure consists of yarns woven in the 2-layer angle interlock weave (as in FIG. 2), each skin of the warp channel configuration has two circumferential yarns for each distance of one yarn diameter—a factor of 4 higher packing density than for a corresponding weft channel structure. Multiple-layer angle interlock weaves with larger numbers of layers give even higher packing densities for the warp channel structures, but the same low packing density for weft channel structures.

The warp channel structure 50 of FIG. 5 may be woven in a flattened form as a multilayered fabric using a Jacquard loom. The "flattened form" of the structure may be obtained by collapsing it in shear. When woven, the flattened form can be erected by reversing the shear into the desired three-dimensional structure. These structures can be woven with several weave patterns within the face sheets, including plain weave and multi-layer angle interlock weave.

A special case of this type of weave is one with zero height of the wall that separates the channels 22: a preform structure 60 results as shown in FIG. 6. The preform structure 60 is a set of joined tubes 62, the optimum shape for pressure containment. In this case the weaving process is greatly simplified and can be achieved using a harness loom, because each weft yarn can pass in one direction across the entire width of the woven structure, in contrast to the case for channels with finite walls, in which each weft yarn must change direction as it passes around each channel of the flattened structure. Details of the weave structure for joined tubes with 2-layer angle interlock face sheets are shown in FIG. 6.

EXAMPLE 2

Active

Referring now to FIG. 3, warp channel structures can also be formed by so-called "distance weaves" that consist of two woven sheets 12 and 14 connected by warp yarns 21 that pass alternately from one sheet to the other. Such structures can be woven with several weave patterns within the face sheets, including plain weave and multilayer angle interlock. An example with plain weave is shown in FIG. 3. In contrast to existing distance weave structures, the yarn pattern in FIG. 3 is modified so that warp yarns 16 forming a skin and warp yarns that form the wall 20 are gathered within the same gap in the beat-up comb, so that they lie over and under one another rather than next to one another where they contact in the fabric. This feature avoids the formation of gaps in the skins, which raises the packing density of fibers forming the channels and promotes hermetic containment of pressurized coolant in the channels.

EXAMPLE 3

Active

An actively cooled ceramic composite panel, similar to the embodiment of the invention shown in FIG. 2, comprises upper and lower skins 12 and 14 interwoven to form channels 22 that can be used for circulating cooling fluid. The upper and lower skins comprise tightly woven cloths of ceramic fibers (carbon, for example) with a matrix of SiC. Examples of weave patterns within the skins include angle interlock, plain weave, and satin weave.

Before infiltrating the fiber structure with the SiC matrix, it is also preferable to coat all of the fiber surfaces with a thin layer (approximately 0.2 $\mu$m) of pyrocarbon to provide good mechanical properties in the final ceramic composite. This is easily accomplished by chemical vapor infiltration. The fiber preform is held in the desired shape by carbon or refractory metal mandrels during the CVI processing.

The matrix material is introduced by infiltrating the fiber preform with a polymer precursor for SiC, or with a slurry consisting of crystalline SiC powder suspended in the polymer precursor. The matrix material consisting of combined SiC powder and polymer precursor can also be introduced by separate infiltrations of a slurry of crystalline SiC powder (in another fluid) and the polymer precursor. Various types of polycarbosilanes are known to be suitable precursors. The penetration of the matrix into the preform may be assisted by using vacuum infiltration. After infiltration, the part is heated to a temperature in the range 100 to 400° C. to cure the polymer. It is then heated to a temperature of approximately 1000° C. to pyrolyze the polymer and leave a matrix of SiC with some porosity. The infiltration and pyrolysis cycle is repeated up to about ten times, with each cycle reducing the fraction of residual porosity in the matrix.

EXAMPLE 4

Active

Alternative materials combinations can be processed using the same procedures as in Example 3. These include SiC for the fibers and $Si_3N_4$ for the matrix. The woven yarns may be infiltrated by a precursor polymer that contains elements, which upon heating, decompose to form a desired ceramic matrix material. Examples of such precursor polymers include polyacrylnitrite (PAN) to produce a carbon matrix; polycarbosilane polymer to produce a SiC matrix; polysilazanes to form a $Si_3N_4$ matrix; and polysilane to form a $SiO_2$ matrix. The precursor polymers may also contain other additives that react with the polymer or its decomposition products to provide elements of the final ceramic matrix. An example of this type of precursor is. polysilane polymer with a suspension of particulate Al metal to form a mullite matrix.

The foregoing precursor solutions are described as examples, not limitations, of the various precursors that can be used to impregnate the woven structures of the present invention. Precursor solutions are also known in the art for many other ceramic materials, including oxides such as $Al_2O_3$, $ZrO_2$, $SiO_2$, mullite, and yttrium aluminate, for example. These processing methods are known in the art.

EXAMPLE 5

Active

The woven yarns may be heated and infiltrated by a gas, or a combination of gases, that react or decompose upon contact with the heated yarns to form the desired ceramic matrix surrounding the yarns (chemical vapor infiltration, CVI). Examples include $CH_4$ gas to form a deposit of carbon on fibers heated above 1000° C.; and methyltrichlorosilane to form a deposit of SiC on fibers heated above 1100° C.

The woven yarns may be heated and infiltrated by a liquid, or a combination of liquid and solid, that react or decompose upon contact to form the desired ceramic matrix surrounding the yarns (melt infiltration). Examples include the reaction of carbon and liquid silicon to form SiC. These processing methods are known in the art.

EXAMPLE 6

Active

Figure 7:
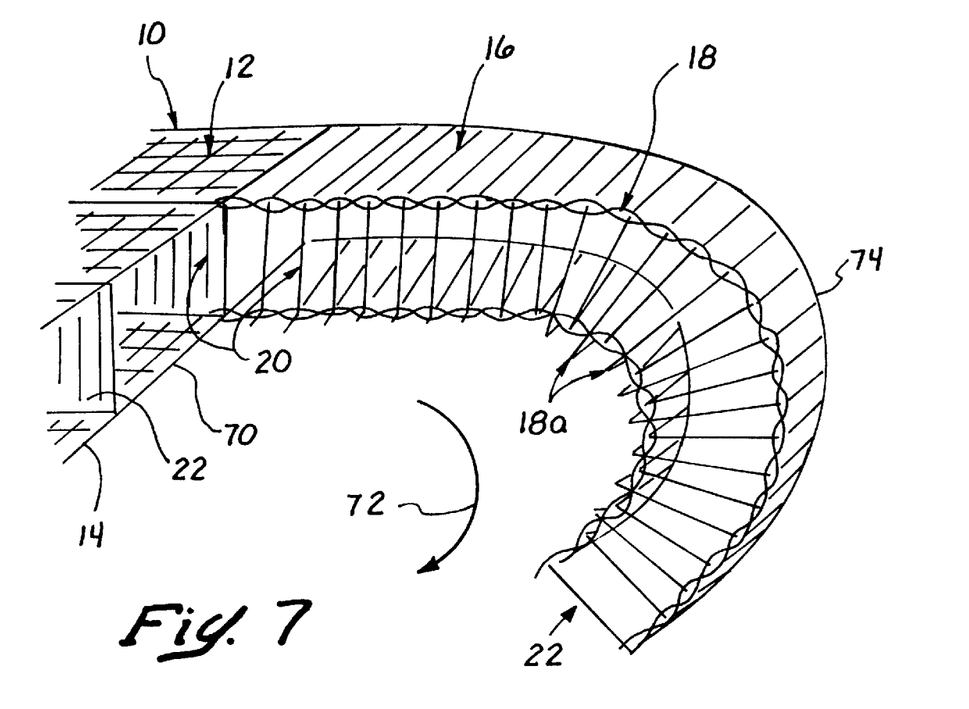
FIG. 7 shows a schematic of the incorporation of attachments or manifolds in the woven structure at the terminus of the warp channels, the shown attachment being curved, according to an embodiment of the invention.

Referring now to FIG. 7, an actively cooled thermal barrier, represented by preform 10, must be joined onto supply lines (not shown) for the ingress and exit of coolant from the coolant containment channels 22 in the barrier. The joining problem is greatly simplified by arranging that joints (not shown) are located away from the heat flux acting on the barrier. In rocket nozzle ramp applications, for example, one appealing solution is to extend the woven structure 12 at the end 70 of the channels 22 around an arc 72 so that the channels 22 curve back under the heated part of the thermal barrier, as shown by curved terminus 74. Here the supply lines are protected from the heat flux and so joints to feed lines will remain relatively cool.

An advantage of warp channel integrally woven structures is that they permit such a curved terminus 74 to be woven in a straightforward manner. As shown in the detail of FIG. 7, curvature can be created by inserting additional weft yarns 18a on the top skin or layer 12, so that when the yarns are beaten up that skin will be longer than the bottom skin or layer 14. The added yarns 18a can be passed through the lower skin 14 so that they protrude on the cool side of the structure (where they do not impede heat flux into the coolant), rather than being woven into the lower skin. In that way, the lower skin 14 can be beaten up to a shorter length than the upper skin.

Figure 8:
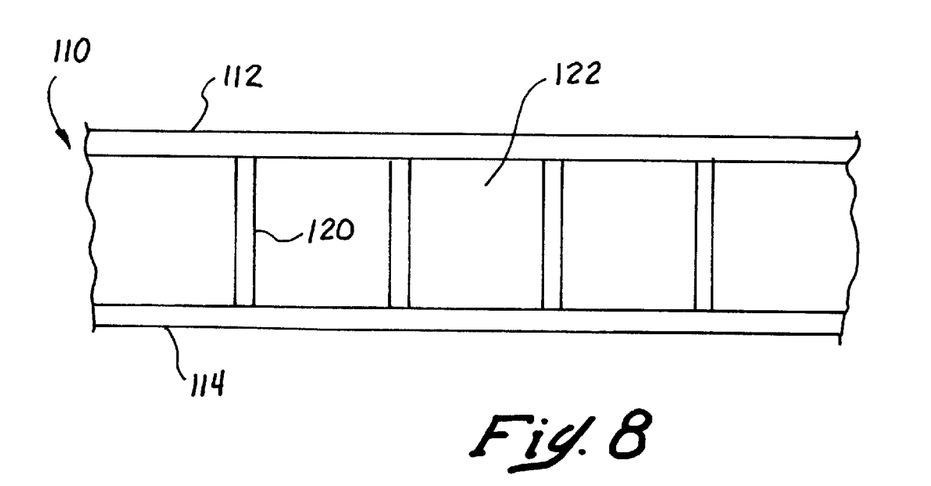
FIG. 8 shows a cross section of a woven material of the present invention with an upper skin, a lower skin, and an open lattice weave connecting the skins according to an embodiment of the invention.
Figure 9:
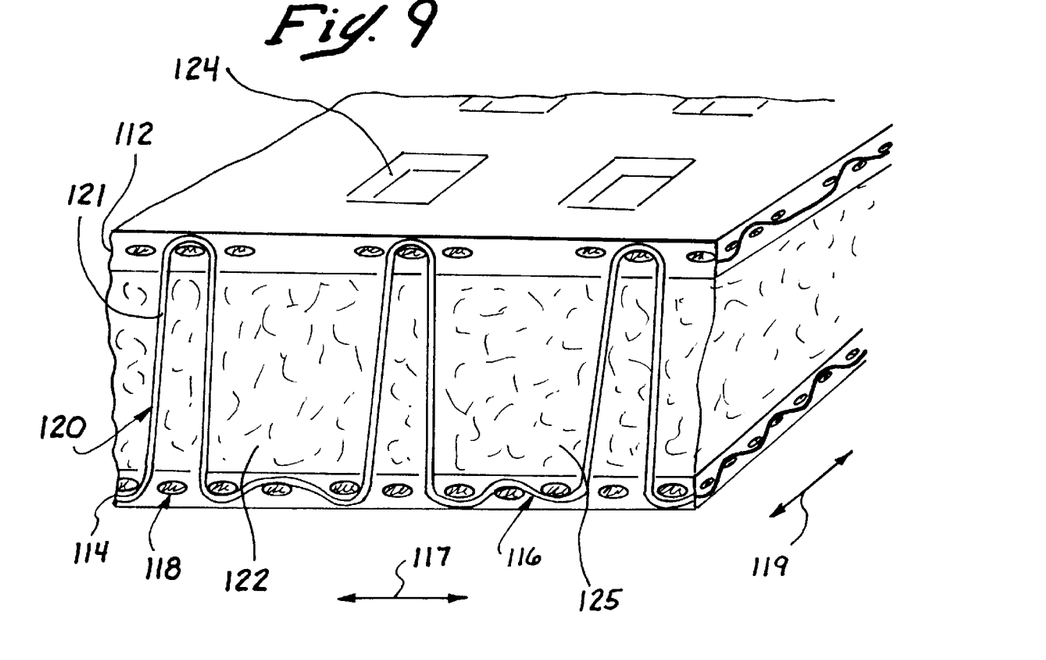
FIG. 9 shows a schematic showing greater detail of the holes or open areas woven into one of the skins of the embodiment of the invention shown in FIG. 8.

Referring now to FIGS. 8 and 9, a woven preform 110 for a ceramic passive thermal insulation structure (not shown) according to an embodiment of the invention comprises "skins" or an upper layer 112 and a lower layer 114 with walls 120 extending therebetween to form channels 122. In other embodiments of the invention, columns, struts, and other structural members may extend between the layers. The structural members and the layers define interlayer spaces, which may be less delineated than the channels 122.

In an embodiment of the invention, the preform 110 comprises materials described above and the ceramic passive thermal insulation structure is formed through infiltration of the preform as described below. Other embodiments of the invention may have one or more central layers, as is described above in connection with FIG. 4.

Referring specifically to FIG. 9, the upper layer 112 and a lower layer 114 of the preform 110 comprise woven fabrics formed of warp 116 and weft 118 yarns that run in warp direction 117 and weft direction 119 respectively. Note that the yarns 121 that make up walls 120 and connect skins 112 and 114 may form individual struts or columns and that various arrangement of rows of columns may form channels that run in either the warp direction or the weft direction. Embodiments of the invention for a passive thermal insulation structure may have channels that run in any direction.

Woven layers 112 and 114 are joined or connected by integrally woven, but relatively sparse and loosely woven, warp 121 yarns . The warp yarns 121 form the walls 120 of the preform 110. Embodiments of the invention may have the structure and geometry of the walls 120 comprise an open lattice weave of various forms, such as supporting struts between layers 112 and 114, that provide desired mechanical and thermal characteristics for the final composite structure.

The woven preform 110 has a top layer 112 that is an open weave that results in openings 124 therethrough. The open weave of the top layer is used in various ways. In an embodiment of the invention, the channels 122 are filled with a low density ceramic insulation 125 material for additional insulation. The insulation 125 is disposed in the channels 122 through the openings 124 in the top layer 112. A slurry (not shown) with the insulation is infiltrated through the openings 124 in the top layer 112 and the carrier of the insulation flows out the preform 110 through the bottom layer 114 or the sides (not shown). Therefore, the openings 124 are large enough for the insulation to pass through, but the relatively tight weave of the bottom layer 114 only permits the carrier to pass through.

Figure 10:
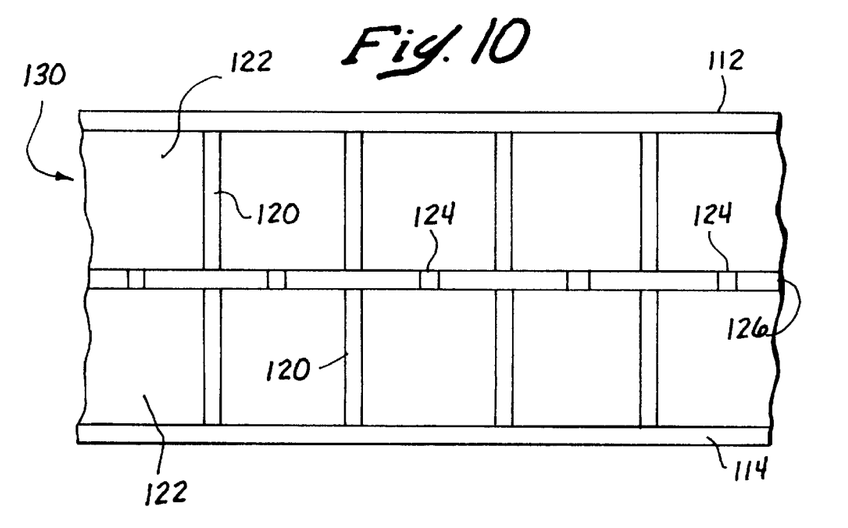
FIG. 10 shows a schematic of a preform with open areas woven into a central layer according to an embodiment of the invention.

Referring now to FIG. 10, in another embodiment of the invention, a preform 130 comprises a central layer 126 with openings 124 therethrough. The preform 130 may be used to make a ceramic composite (not shown) that enables fluid circulation between the channels 122. Such a composite forms an excellent thermal barrier for very high temperatures at the exposed upper layer 112 with cool temperatures at the protected lower layer 114 that can be joined or connected to a supporting structure (not shown).

In another embodiment of the invention, the fibers and matrix of the upper and lower layers 112 and 114 and walls 120 may comprise different materials suited for different temperatures: the upper layer 112 may consist of ceramic fibers and matrix for exposure to high temperatures, while the lower layer 114 may consist of graphite fibers and epoxy matrix for low temperature structural efficiency.

EXAMPLE 1

Passive

The ceramic integrally woven material of the present invention may include a matrix formed by infiltration of the woven yarns by a precursor that produces a ceramic from the monazite and xenotime family, described in U.S. Pat. No. 5,514,474. The woven yarns can be impregnated with a solution, slurry, or solgel that converts to a monazite or xenotime when heated. As specific examples, a woven fiber preform comprising $Al_2O_3$ fibers and another comprising mullite-silica fibers were impregnated with aqueous slurries containing particles of alumina (0.3 mm diameter $\alpha$-$Al_2O_3$, as provided by the Sumitomo Corporation) and solution precursors for $LaPO_4$, one containing lanthanum nitrate and methylphosphonic acid and the other containing lanthanum nitrate and phosphorous acid. These solutions contained lanthanum and phosphorus in the ratio of 1:1. Concentrations in the range of 1 to 2 moles per liter of the solution precursor were found to be suitable, with the lower concentrations preferred for thinner coatings of La-monazite and the higher concentrations preferred for thicker coatings. Phytic acid has also been used successfully as a precursor with lanthanum nitrate. The precursor slurries were able to wet and infiltrate between individual fibers of the woven material. After heating at about 1100° C. for an hour, the solution precursors converted to $LaPO_4$ (La-monazite) resulting in a two-phase ceramic matrix consisting of $LaPO_4$ grains and $Al_2O_3$ grains and fine-scale porosity 30.

EXAMPLE 2

Passive

In an embodiment of the invention, the preform 110 may comprise a lower skin 114, integral struts 120, an upper skin 112, and a low density ceramic insulation material 125. The lower skin 114 may comprise a tightly woven cloth of $Al_2O_3$ fibers (in a double layer angle interlock weave pattern, for example) with a matrix of $Al_2O_3/LaPO_4$. The upper skin 112 may comprise the same materials, but with a weave pattern that contains periodic gaps of at least 2 mm width that do not contain either fibers or matrix. The connecting struts comprise individual fiber tows (yarns), integrally woven with both skins, and having the same $Al_2O_3/LaPO_4$ matrix.

The matrix may be formed by infiltration with a slurry comprising $Al_2O_3$ powder in an aqueous solution precursor for $LaPO_4$, as described in example 1-passive.

The low density ceramic insulation material may comprise short ceramic fibers ($Al_2O_3$ fibers of 100 $\mu$m length and 3 $\mu$m diameter, for example) distributed in a random three dimensional arrangement. Some rigidity and strength can be imparted to the network of insulating fibers by bonding pairs of fibers where they touch. The insulating fiber network is introduced into the ceramic composite lattice structure or framework by forming an aqueous slurry of dispersed fibers, placing the composite structure into a pressure filtration die with the fiber slurry, and applying pressure to remove excess water and concentrate the fiber network within the composite structure. The presence of openings in the upper skin with average widths being larger than the lengths of the dispersed fibers permits transportation and concentration of the dispersed fibers into the channels within the composite structure. The insulating composite panel, comprising the framework and consolidated fibers, is removed from the pressure filtration die and dried to remove the remaining water. Bonding at the fiber intersections is achieved using a solution or polymer precursor that is converted to ceramic during a subsequent heat treatment. The precursor is included in the slurry used to transport the insulating fibers into the composite framework and is deposited at the fiber intersections during the drying step described above. Alternatively, the precursor can be introduced by a separate infiltration step after the drying step. Bonding of the intersecting fibers can also be achieved by heating the consolidated composite to a temperature sufficiently high to cause solid state sintering of touching fibers or, in the case of fibers that contain a glass phase, melting and bonding of the glass phase where the fibers are in contact.

EXAMPLE 3

Passive

Figure 11:
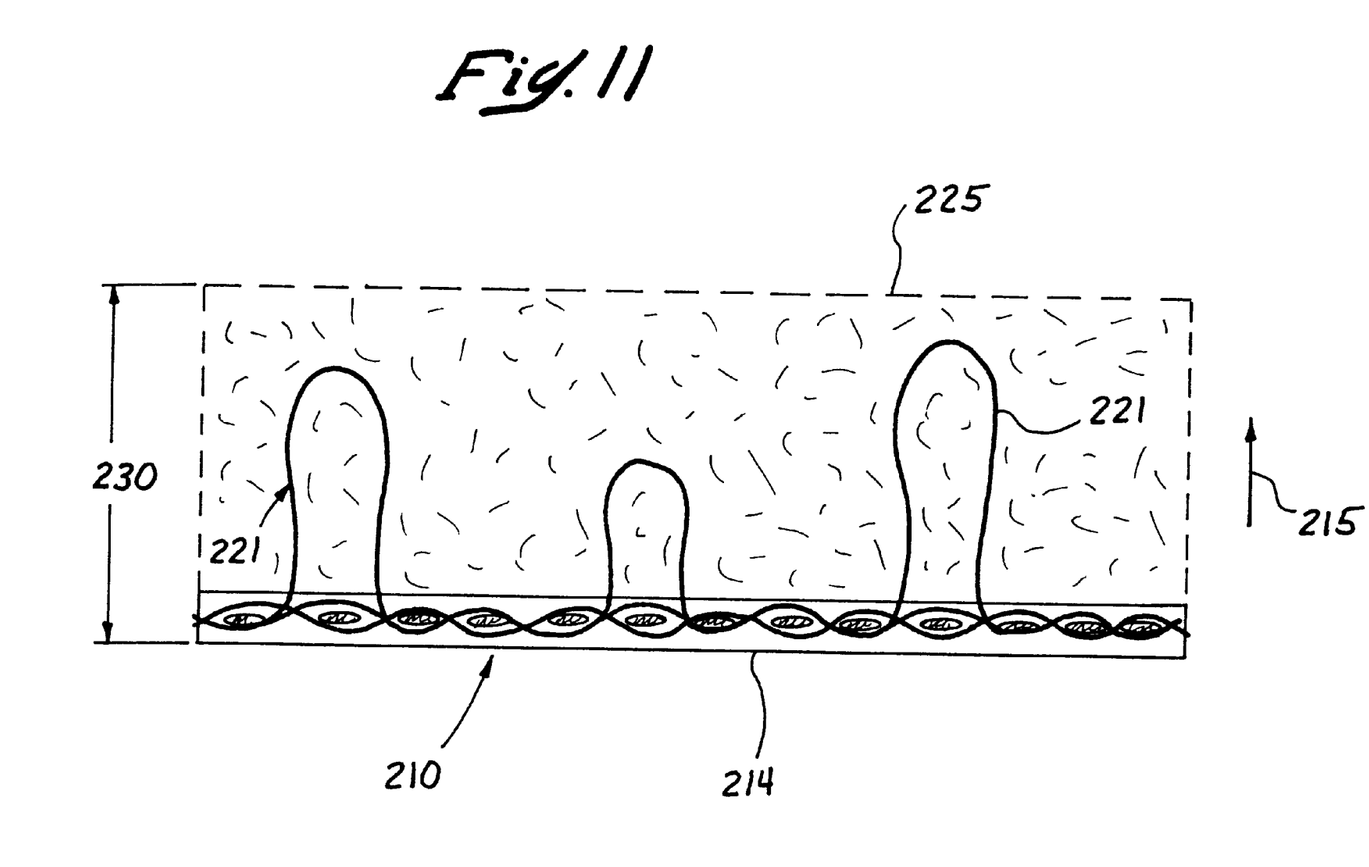
FIG. 11 shows a schematic of a preform with a showing a lower skin and integrally woven loops according to an embodiment of the invention.

Referring now to FIG. 11, a woven preform 210 comprises a lower skin or bottom layer 214 with integral struts or loops 221 protruding therefrom in an upward direction 222, and a low density ceramic insulation material 225. The lower skin 214 may comprise a tightly woven cloth of $Al_2O_3$ fibers (in a double layer angle interlock weave pattern, for example) with a matrix of $Al_2O_3/LaPO_4$. The connecting struts 221 may comprise individual fiber tows (yarns), integrally woven with the lower skin 214 and having the same $Al_2O_3/LaPO_4$ matrix.

A ceramic composite matrix (not shown) may be formed from the bottom skin 214 and the struts 221 from $Al_2O_3$ and $LaPO_4$ by the same method described in Example 2-passive.

The low density ceramic insulation 225 comprises the same materials as in example 2-passive and is introduced into the space between and around the struts 221 in the same manner as well. The consolidated network of insulating fibers that forms the low density ceramic insulation 225 may form a layer of thickness 230 equal to the height of the struts 221 or a layer of thickness greater than the height of the struts, as determined by adjusting the volume of slurry used during the filtration step. In either case, the struts 221 serve to anchor the ceramic composite skin 214 to the body of the low density insulating material 225.

EXAMPLE 4

Passive

The preforms 110, 130, and 210 may be infiltrated by a precursor polymer that contains elements, which upon heating, decompose to form a desired ceramic matrix material. Examples of such precursor polymers include polyacrylnitrite (PAN) to produce a carbon matrix; polycarbosilane polymer to produce a SiC matrix; polysilazanes to form a $Si_3N_4$ matrix; and polysilane to form a $SiO_2$ matrix. The precursor polymers may also contain other additives that react with the polymer or its decomposition products to provide elements of the final ceramic matrix. An example of this type of precursor is polysilane polymer with a suspension of particulate Al metal to form a mullite matrix.

The foregoing precursor solutions are described as examples, not limitations, of the various precursors that can be used to impregnate the woven structures of the present invention. Precursor solutions are also known in the art for many other ceramic materials, including oxides such as $Al_2O_3$, $ZrO_2$, $SiO_2$, mullite, and yttrium aluminate, for example.

EXAMPLE 5

Passive

The preforms 110, 130, and 210 may be heated and infiltrated by a gas, or a combination of gases, that react or decompose upon contact with the heated yarns to form the desired ceramic matrix surrounding the yarns. Examples include $CH_4$ gas to form a deposit of carbon on fibers heated above 1000° C.; and methyltrichlorosilane to form a deposit of SiC on fibers heated above 1100° C.

EXAMPLE 6

Passive

Two skins may be formed as two layers of plain, or satin, or angle interlock, or other weave comprising warp and weft yarns woven in a loom at approximately the desired (final) skin separation. Open spaces may be left intentionally in one or both skins by omitting selected warp or weft yarns or by incorporating temporary spacers in the skin as it is being woven. The two skins may be connected by warp or weft yarns (called pile yarns) woven alternately into the fabric of one and then the other skin in a repeating pattern. With this method, friction and stiffness of the pile yarns is sufficient to maintain the desired separation of the skins. The pile yarns may be made to pass approximately at right angles from one skin to the other or at some other angle by selection of the particular yarns in the two skins around which they are to be woven. This weaving method is known in the art, but not with deliberately incorporated holes or open spaces for the purpose of introducing insulating material into the interior.

Although the present invention has been described with respect to specific embodiments thereof, various changes and modifications can be carried out by those skilled in the art without departing from the scope of the invention. Therefore, it is intended that the present invention encompass such changes and modifications as fall within the scope of the appended claims.

What is claimed is:

1. A woven preform for a ceramic composite comprising:
    plurality of layers of woven yarns of fibrous material;
    structural members extending between the layers;
    the layers and the structural members defining interlayer spaces;
    low density ceramic insulation being disposed in the interlayer spaces; and
    a plurality of openings extending through at least one of the layers, wherein said openings are large enough for the insulation to pass through.

2. The woven preform of claim 1, wherein the low density ceramic insulation comprises fibers having a length shorter than an average width of the openings.

3. The woven preform of claim 1, wherein the plurality of layers of woven yarns comprise:
    an upper layer;
    a lower layer; and
    one or more central layers disposed between the upper and lower layers.

4. The woven preform of claim 3, wherein at least a portion of the plurality of openings extend through the upper layer.

5. The woven preform of claim 3, wherein at least a portion of the plurality of openings extend through at least one of the central layers.

6. The woven preform of claim 3, wherein low density ceramic insulation is disposed in the interlayer spaces, the insulation comprising of fibers having a length shorter than an average width of the openings.

7. The woven preform of claim 6, wherein the opening average width is approximately 2 mm or greater.

8. The woven preform of claim 6, wherein the low density ceramic insulation comprises $Al_2O_3$ fibers or $SiO_2$ fibers that are randomly distributed in a three dimensional arrangement.

9. The woven preform of claim 1, wherein the interlayer spaces are channels that are defined by the layers and the structural members.

10. The woven preform of claim 9, wherein the channels extend in a warp direction.

11. The woven preform of claim 9, wherein low density ceramic insulation is disposed in the channels.

12. The woven preform of claim 1, wherein a ceramic composite comprises the woven preform and a matrix.

13. A woven preform for a ceramic composite, the preform comprising:
    at least three spaced layers of woven yarns of fibrous material; and
    walls extending between the layers;
    wherein the layers and the walls define channels that extend in a warp direction.

14. The woven preform of claim 13, further comprising:
    low density ceramic insulation that is disposed in the channels; and
    a plurality of openings extending through one of the layers.

15. The woven preform of claim 10, wherein the channels are further defined by circumferentially woven weft fibers.

16. The woven preform of claim 15, wherein the channels are generally cylindrical.

17. The woven preform of claim 10, wherein a ceramic composite comprises the woven preform and a matrix.

18. The woven preform of claim 15, wherein a ceramic composite comprises the woven preform and a matrix.

19. The woven preform of clai 15, wherein a ceramic composite comprises the woven preform and a matrix.

20. The woven preform of claim 16, wherein a ceramic composite comprises the woven preform and a matrix.

21. The woven preform of claim 13, wherein the channels are further defined by circumferentially woven weft fibers.

22. The woven preform of claim 21, wherein the channels are generally cylindrical.

23. The woven preform of claim 14, wherein the channels are defined by circumferentially woven weft fibers.

24. The woven preform of claim 23, wherein the channels are generally cylindrical.

25. A process for weaving a ceramic preform comprising the step of weaving warp channels that are defined by three spaced layers with structural members extending between the three layers.

26. The process of claim 25, wherein the weaving the warp channels step further comprises the step of weaving the warp channels such that weft fibers are circumferentially disposed about the warp channels.

27. A ceramic preform made by the process of claim 26.

28. The process of claim 27, wherein the channels are generally cylindrical.

29. A ceramic preform made by the process of claim 28.

30. The process of claim 26, further comprising the step of weaving a terminus end from an end of at least one of the warp channels.

31. A ceramic preform made by the process of claim 30.

32. The process of claim 26, further comprising the step of weaving a curved terminus extending from an end of at least one of the warp channels.

33. A ceramic preform made by the process of claim 32.

34. The process of claim 32, wherein the weaving the curved terminus step comprises the step of inserting additional weft fibers into a side of the curved terminus such that the curved terminus side is longer than an opposing curved terminus side after beating.

35. The process of claim 34, wherein the weaving the curved terminus step further comprises the step of not weaving the additional weft fibers in to the opposing curved terminus side.

36. The process of claim 32, wherein the weaving the curved terminus step comprises the step of not weaving all of the weft fibers into a side of the curved terminus such that the curved terminus side is shorter than an opposing curved terminus side after beating.

37. A process for weaving a ceramic preform comprising the steps of:
   a) weaving warp channels that are defined by two layers with structural members extending between the two layers, wherein weft fibers are circumferentially disposed about the warp channels; and
   b) weaving a curved terminus extending from an end of at least one of the warp channels, wherein step b) includes a step of inserting additional weft fibers into a side of the curved terminus such that the curved terminus side is longer than an opposing curved terminus side after beating.

38. The process of claim 37, wherein the weaving the curved terminus step further comprises the step of not weaving the additional weft fibers into the opposing curved terminus side.

39. A process for weaving a ceramic preform comprising the steps of:
   a) weaving warp channels that are defined by two layers with structural members extending between the two layers, wherein weft fibers are circumferentially disposed about the warp channels; and
   b) weaving a curved terminus extending from an end of at least one of the warp channels, wherein step b) further comprises the step of not weaving all of the weft fibers into a side of the curved terminus such that the curved terminus side is shorter than an opposing curved terminus side after beating.

40. A woven preform for a ceramic composite, the preform comprising:
   at least two layers of woven yarns of fibrous material;
   walls extending between the layers, said walls being disposed substantially orthogonally to each of said two layers;
   the layers and the walls defining substantially rectangular channels that extend in a warp direction;
   low density ceramic insulation that is disposed in the channels; and
   a plurality of openings extending through one of the layers, wherein said openings are large enough for the insulation to pass through.

41. A woven preform for a ceramic composite, the preform comprising:
   at least two layers of woven yarns of fibrous material;
   substantially cylindrical channels that extend in a warp direction between said layers;
   low density ceramic insulation than is disposed in the channels; and
   a plurality of openings extending through one of the layers, wherein said openings are large enough for the insulation to pass through.

42. A woven preform for a ceramic composite, the preform comprising:
   at least two layers of woven yarns of fibrous material;
   walls extending between the layers, the layers and the walls defining channels that extend in a warp direction;
   low density ceramic insulation disposed in said channels; and
   a plurality of openings extending through one of the layers, wherein said openings are large enough for the insulation to pass through.

* * * * *

UNITED STATES PATENT AND TRADEMARK OFFICE
CERTIFICATE OF CORRECTION

PATENT NO. : 6,418,973 B1
DATED : July 16, 2002
INVENTOR(S) : Cox et al.

It is certified that error appears in the above-identified patent and that said Letters Patent is hereby corrected as shown below:

Column 5,
Line 64, please insert -- 10 -- after "preform"

Column 7,
Line 58, please change "yams" to -- yarns --
Line 66, please change "yam(s)" to -- yarn(s) --

Column 11,
Line 66, please change "(yams)" to -- (yarns) --

Signed and Sealed this

Third Day of December, 2002

JAMES E. ROGAN
*Director of the United States Patent and Trademark Office*